F. J. RANDALL.
Corn Harvester and Husker.
No. 201,830. Patented March 26, 1878.
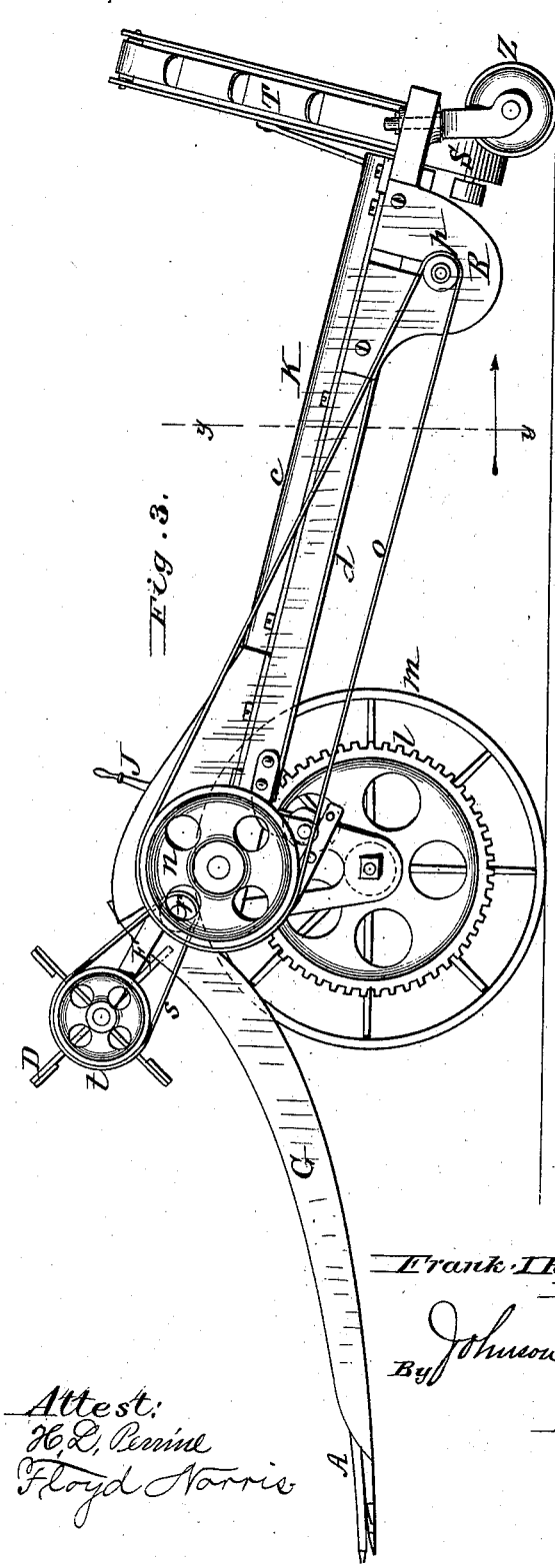
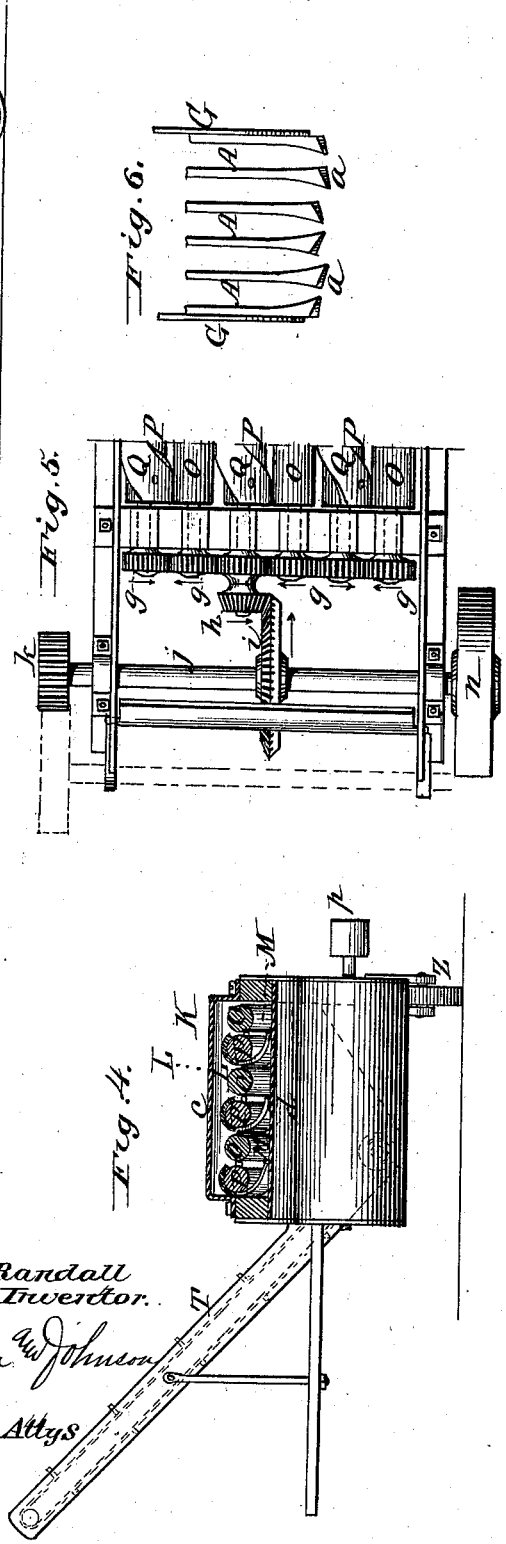

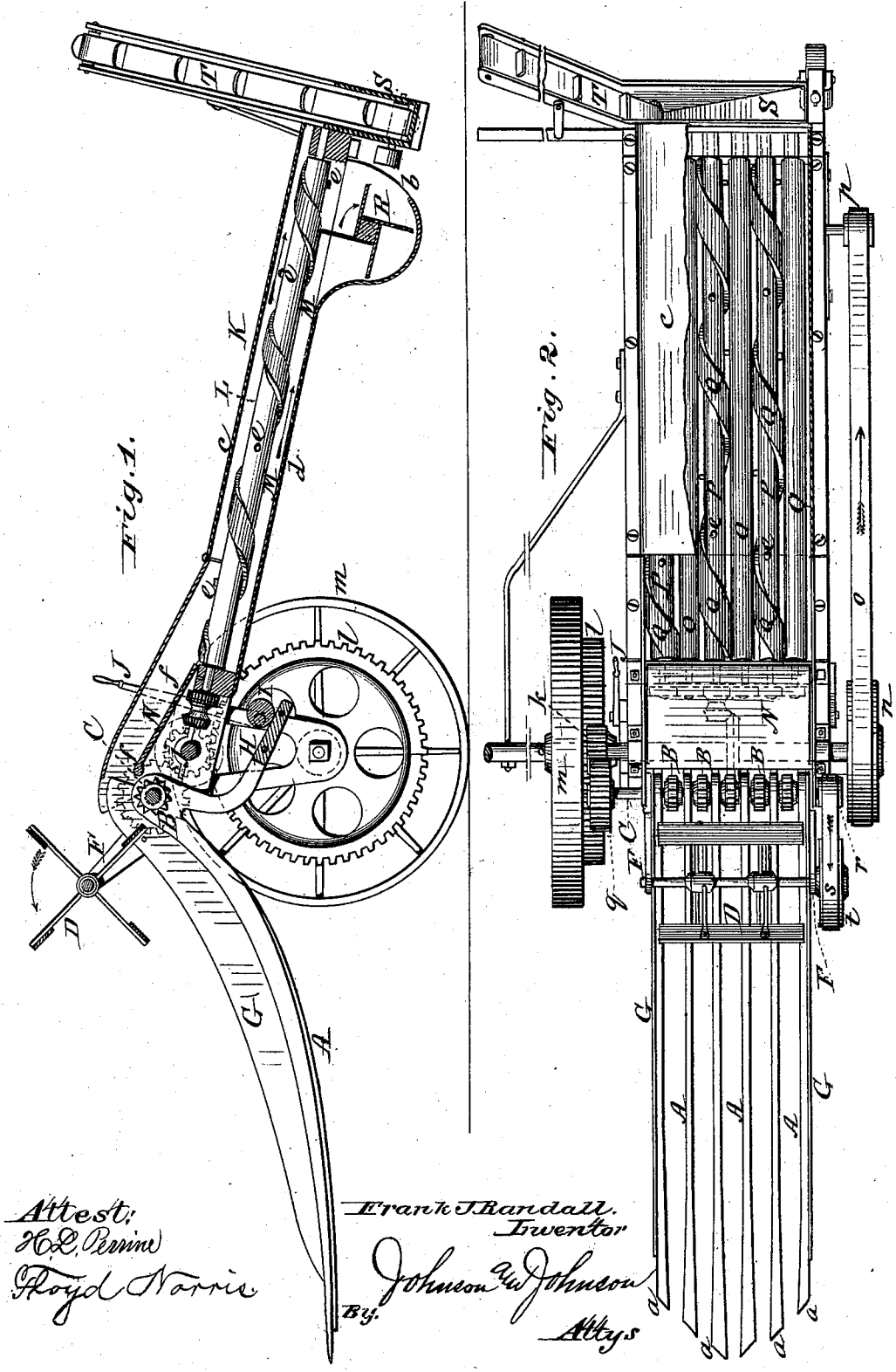

UNITED STATES PATENT OFFICE.

FRANK J. RANDALL, OF AURORA, ILLINOIS.

IMPROVEMENT IN CORN HARVESTERS AND HUSKERS.

Specification forming part of Letters Patent No. 201,830, dated March 26, 1878; application filed February 25, 1878.

*To all whom it may concern:*

Be it known that I, FRANK J. RANDALL, of Aurora, in the county of Kane and State of Illinois, have invented certain new and useful Improvements in Corn Harvesters and Huskers; and I do hereby declare that the following is a full, clear, and exact description thereof, which will enable others skilled in the art to which it appertains to make and use the same, reference being had to the accompanying drawings, and to letters of reference marked thereon, which form a part of this specification.

My machine is for gathering the ears of corn from the standing stalks in the field and husking the ears, and delivering both the husked ears and the husks in separate receptacles.

The corn-stalks are gathered between fingers as the machine is drawn forward, and the ears are separated from the stalks by said fingers, and by the revolving action of small toothed separators arranged upon a horizontal axis, between the inner ends of the fingers, and the co-operating action of a reel, the ribs of which revolve in close proximity to the fingers and the revolving toothed separators.

The gathering-fingers, the revolving toothed separators, and the reel constitute the front of the machine, and are attached to the frame as a single structure, so that the points of the fingers can be raised and lowered upon the axis-shaft of the toothed separators, to take up fallen corn and suit its varying height.

As the ears of corn are stripped from the stalks they are delivered upon husking-rolls arranged in a case having a rearward inclination and an unobstructed through-space above the rolls, opening into a rear delivery-receptacle for the husked ears of corn, and having also an unobstructed through-space below the rolls opening into a rear receptacle for the husks, a suction-fan being combined therewith.

The rolls are of peculiar construction and adaptation for effecting the husking and carrying back the ears of corn, being arranged for that purpose in pairs, one member of which has unbroken cylindrical surfaces, of rubber or other suitable material, and the other strips of rubber or other suitable material wound spirally thereon so as to make the contact of each pair only at the joinings of the coiled strips, by which, as the rolls revolve, the husks are caught and pulled off the ears, while the spaces between the coils and the unbroken-surfaced rolls allow the husks to pass through into the lower chamber. This, however, would not be completely effective for the purpose, and I have therefore combined with the husking-rolls and the case an exhaust-fan arranged at the delivery end of the chamber beneath the rolls, so that the suction draws the loosened and separated husks and silk down between the rolls and out into a suitable receptacle at the side or rear of the machine, from which they can be gathered and preserved for use.

During the husking action the spiral coils also feed the ears along down the rolls, and deliver them into an elevating-trough, by which they are carried into the wagon or other receptacle.

The spaces between the fingers are sufficient to allow the corn-stalks to pass through, but will retain the ears of corn which may be separated thereby.

The reel gathers and forces back the ears pulled off by the fingers, and, in connection with the revolving toothed separators, breaks off the others remaining on the stalks, and carries them over onto the rolls, which revolve rapidly toward each other in pairs, while the fan creates a powerful under suction downward between the rolls, and draws through the spaces of the rolls the loosened and separated husks and silk, thereby greatly facilitating the husking action, and keeping the machine free from being clogged and choked by the husks.

The gathering-fingers are all pointed on one side each way from the middle, to prevent too many stalks entering between them and clogging them. The middle fingers are also raised above the others, to avoid entering the hill around the corn when lowered to take up leaning or fallen stalks.

The rolls having the surface elastic spiral coils are also provided with pins or teeth in the spaces between the coils, for piercing and loosening the husks, so that the exhaust can draw them more readily down between the rolls into the exhaust-space, so that nothing is left upon the rolls in the top space but the stripped ears of corn to be carried down by the action of the roll-coils.

Referring to the drawings, Figure 1 represents a vertical longitudinal section of a corn-harvesting machine embracing my invention; Fig. 2, a top view, with the cover of the casing partially removed to expose the husking-rolls; Fig. 3, an elevation of the side of the machine; Fig. 4, a cross-section of the husking-rolls and their inclosing-case, showing more clearly the space above the rolls for conducting away the stripped ears and the husk-exhausting space below the rolls; Fig. 5, a view showing the gearing for giving the husking-rolls their reverse motion in pairs; and Fig. 6, a front view of the gathering-fingers, showing the middle ones elevated at their points above the others.

The machine can be carried on wheels and drawn by horses; or it may be attached to an ordinary wagon by braces in any suitable manner.

That portion of the machine which comprises the harvester proper consists of a series of frontward-projecting fingers, A, curving downward from the front end of the machine. A series of toothed separators, B, arranged upon a horizontal transverse axis, C, upon which the fingers are hung and in the spaces between the fingers, so that their teeth will not project but very little, if any, above said fingers, and a reel, D, arranged so that its blades will sweep over the fingers in front of the toothed separators and in close proximity thereto, so as to act in conjunction therewith, to break the ears of corn from the stalks and deliver them into the husking portion of the machine, to be treated in a manner to be presently described. The harvesting device thus described is secured to the front end of the machine, by two side arms, and in such manner that the gathering-fingers can be raised and lowered bodily to adapt them to the height of the standing corn, and to take up leaning and fallen stalks, the axis-shaft of the toothed separators serving as the hinge or fulcrum-rod for such adjustment.

The fingers are of metal bars, with sufficient spaces between them to allow the corn-stalks to pass singly therein; and to prevent too many stalks entering between said fingers, their ends are flattened and beveled to one side at *a* each way from the middle, and thus prevent them from being choked. These fingers strip off the ears of corn by their angular edges, and carry them to the action of the reel, which, in connection with the revolving toothed separators B, breaks off the ears that still cling to the stalks, and especially those nearest their tops, and thus completes the separation of all the ears from the stalks.

The reel is carried by two arms, F, projecting forward and upward from the finger-frame, and it is caused to revolve so as to deliver the ears of corn backward, while the toothed separators are caused to revolve toward the front, so as to more effectually break off the ears from the stalks. The outside fingers are provided with side guards G, to prevent the ears which have been stripped by the fingers from falling off, and the points of the middle fingers are elevated above the others, as shown in Fig. 6, for the purpose of passing over the hills without entering them when said fingers are lowered to gather up leaning or fallen corn.

The structure forming the gathering-fingers has a rearward and downward extension, H, beneath the front end of the main frame, starting from the hinge or axis C of the revolving toothed separators, and in position to receive the action of an eccentrically-hung roller or cam, I, fitted in bearings beneath the main frame, and turned or acted upon by a hand-lever, J, arranged at the side of the frame within convenient reach of the driver upon the wagon, or upon the main frame, so that by this lever he can raise and lower the gathering-fingers, as may be required, to suit the condition and height of the corn.

As stated, the husking device joins the gathering device, and extends backward in a direct line therefrom. It consists of long rolls arranged to revolve toward each other in pairs within a long narrow case, K, in which they have their journal-bearings at each end. This case is closed at top *c* and bottom *d*; but the top portion is open at each end. The rolls are arranged to divide this case into an upper and lower unobstructed space, L and M, extending from near the front to the rear end of said case. The rolls do not join the revolving toothed separators B; but a space is left between the front ends of such rolls and the revolving toothed separators, for the arrangement of the gearing by which the husking-rolls are driven, and which will be presently described. This intervening space is covered by a slightly downward-inclined plate, N, hinged just in rear of the revolving toothed separators to the sides of the case, and extending to the front ends of the rolls, forming a plane, upon which the stripped ears are directed upon the husking-rolls. One, O, of each pair of these rolls is covered with rubber, in the manner of wringer-rolls, while the other, P, is wound spirally with a strip of rubber, Q, of suitable width from one end to the other, and forming a combination of elastic rolls with unbroken surfaces with rolls of broken surfaces, formed by the spiral surface elastic coils, which make the contact between the rolls, the object of which is to seize the husks and silk, and tear them from the ears of corn as they are fed by the action of the spiral coils down the surfaces of the rolls, which are inclined toward the rear end to assist in their backward feed through the upper space of the case, while the husks are drawn by the rolls down between them into the space beneath the rolls in the case. A suction-fan, R, is arranged at the rear open end of this lower space M, to produce a strong suction between these rolls, to effect the complete drawing of the separated husks down between them, and out at the rear open end $b$ of the lower husk-discharging space.

This exhaust device may be arranged at the side of the case, and open into the lower space; but I prefer to arrange it crosswise within the case at its open or delivery end, as shown in the drawings. The front end of this lower space is closed, so that the suction from the fan is directly downward through the spaces between the rolls.

By this combination and action of the rolls and the suction-blast the rolls are kept comparatively free from the husks, and the upper space is therefore free for the proper action of the husking-rolls, and for the discharge of the stripped ears of corn, which are delivered at the open rear end of said space into a receptacle, S, from which they are conveyed by an elevator, T, into the wagon or other proper receiver.

The stripping action of the rolls is aided by pins $e$ on the surfaces of the rolls between the spiral coils, which operate to slit the husks, and thus render them the more easily torn off by the action of the rolls.

The receiving portion $f$ of the upper space L is widened to allow the ears to pass freely upon the rolls; but that portion of the cover overlying the rolls makes the space comparatively shallow, so as to hold the ears to the action of the rolls. This is an important advantage; but the space is ample to prevent choking of the ears therein. The suction-fan, in keeping the upper space free from the husks, also keeps the husks and silk from winding around the rolls during the operation of the machine. Its force may be made ample for the purpose, and the husks thereby preserved in condition to be sold for mattresses.

The husking-rolls are driven with considerable speed, and, as stated, they are revolved in pairs toward each other. This is effected by means of small pinions $g$ on the front ends of the rolls gearing with each other, one of the middle rolls being provided with a bevel-pinion, $h$, into which meshes a bevel-wheel, $i$, on a transverse shaft, $j$, mounted in frame-bearings in the space in front of the rolls, and beneath the inclined hinged plate N. This shaft is driven by a pinion, $k$, on one end, which gears with a cog-wheel, $l$, on the axle of the driving-wheel $m$, which is arranged next the wagon when one is used, so as to utilize all the power possible. The other end of this shaft $j$ has a pulley, $n$, from which a band, $o$, leads to a small pulley, $p$, on the shaft of the exhaust-fan, so as to drive it in the proper direction, and with the proper speed to give the required force to the suction.

The axis of the revolving toothed separators has a spur-pinion, $q$, which meshes with and derives its motion from the pinion $k$ on the transverse shaft $j$, giving the toothed separators also a rapid motion. The other end of the toothed separator-shaft has a small pulley, $r$, from which a band, $s$, leads to a pulley, $t$, on the reel-shaft, so that by this connection the motion of the toothed separators is toward the front, while that of the reel is toward the rear, and these two motions co-operate to break off the ears of corn which remain adhering to the stalks.

Any suitable number of husking-rolls may be used.

The toothed separators are steel-pointed, and as the reel forces the ears of corn upon them, they cut, break, and sever the stems of the ears from the stalks, somewhat similar to the action of hand-breaking.

The gathering device is made in pieces, so that in case a finger is bent or broken, it can be taken out and replaced.

Two drive-wheels may be used, if desired, and the rear of the machine is provided with a caster-wheel, Z, to facilitate the turning of the machine.

The device for elevating and conveying away the husked ears may be driven in any suitable way. The husks may be collected in a wire box carried on wheels, and attached to the mouth of the exhaust-fan, and from which the husks are removed and bound up. A wire cylinder may be used in rear of the revolving separators, and beneath which the ears are carried for the purpose of slitting the husks before reaching the husking-rolls.

The hinged covering-plate N for the roll-gears can be turned up to get at the gearing should it, from any cause, require cleaning.

The toothed separators are formed upon hubs, which are strung upon the hinge C of the fingers, and between them and the teeth are made sharp, for the purpose stated.

The flaring portion of the case-cover $c$ is hinged for access to the hinged plate N and to the husking-rolls.

I claim—

1. The gathering-fingers, the reel-carrying frame, and the revolving toothed separators, constituting a single structure, having for its hinge the axis-shaft of the toothed separators, and adapted to be turned upon said axis-shaft to adjust the height of the fingers, for the purpose specified.

2. The hinged-finger gathering device, having the under extension H, in combination with the eccentric or cam device I and the hand-lever J, pivoted to the main frame, for the purpose specified.

3. The gathering-fingers A, beveled or pointed on one side each way from the middle fingers, for the purpose specified.

4. The husking-rolls O, having unbroken elastic surfaces, in combination with the rolls P, having spirally-wound elastic strips Q and intervening pins $e$, as set forth.

5. The finger-carrying frame A G H and the revolving toothed separators B, arranged upon and carried by the same shaft C, said finger-frame being adapted to be oscillated upon said shaft, while preserving its relation to said toothed separators, as set forth.

6. The case K, closed at the top and bottom, and the husking-rolls, arranged to divide its interior into two separate and distinct longitudinal spaces, L M, the lower one of which is closed at its front end, and provided with an exhaust-fan, R, at its open rear end, and the upper space having an open receiving end and an open discharging end, all constructed and adapted for operation as specified.

7. The combination, with the casing and with the husking-rolls O P, having contacting surfaces to form intervening spaces, opening into a bottom passage, M, as described, of an exhaust-fan, B, arranged and operating to produce a suction through said roll-spaces, to aid in separating and to gather the husks, as described.

In testimony that I claim the foregoing I have affixed my signature in the presence of two witnesses.

FRANK JOHN RANDALL.

Witnesses:
WM. LORD, Jr.,
L. W. BLAKESLY.